US005170159A

United States Patent [19]

Kawabata et al.

[11] Patent Number: 5,170,159

[45] Date of Patent: Dec. 8, 1992

[54] SLEEP TIMER FOR AUDIO/VISUAL APPARATUS AND METHOD OF SLEEP TIMER OPERATION

[75] Inventors: Yoshihiro Kawabata; Takehiko Kuroiwa; Kazuya Tsukada; Shinji Sugiyama; Naoyuki Arai; Kikuo Ishikawa, all of Tokyo, Japan

[73] Assignee: Pioneer Electronic Corporation, Tokyo, Japan

[21] Appl. No.: 636,473

[22] Filed: Dec. 31, 1990

[30] Foreign Application Priority Data

Jan. 5, 1990 [JP] Japan ........................................ 2-287

[51] Int. Cl.[5] ............................................. H04Q 1/00

[52] U.S. Cl. ............................ 340/825.22; 455/181.1; 455/231; 358/349

[58] Field of Search ...................... 340/825.22, 309.15, 340/309.4; 455/181, 231, 229, 182; 219/10.55 B; 358/349, 190

[56] References Cited

U.S. PATENT DOCUMENTS 3,843,929 10/1974 Mayle .
4,158,759 1/1979 Mason .......................... 219/10.55 B
4,241,450 12/1980 Blatter et al ......................... 358/190

FOREIGN PATENT DOCUMENTS 59-011029 1/1984 Japan .
60-90476 5/1985 Japan .
60-202384 10/1985 Japan .
1-32188 2/1989 Japan .
2023363 12/1979 United Kingdom .

*Primary Examiner*—Donald J. Yusko
*Assistant Examiner*—Brian Zimmerman
*Attorney, Agent, or Firm*—Sughrue, Mion, Zinn, Macpeak & Seas

[57] ABSTRACT

A sleeper timer for the source equipment of audio/-visual apparatuses such as a cassette tape deck, CD player, AM/FM tuner, and video disk play incorporates an auto sleep mode where the source equipment are turned off as soon as the source equipment completes its operation, and a conventional sleep timer mode where the source equipment are turned off when a predetermined length of time of a timer expires.

7 Claims, 5 Drawing Sheets

SLEEP TIMER FOR AUDIO/VISUAL APPARATUS AND METHOD OF SLEEP TIMER OPERATION

BACKGROUND OF THE INVENTION

1. Field of the Invention

The present invention relates to a method of sleep timer operation and a timer, and more particularly to a method of sleep timer operation and a sleep timer used in audio/visual apparatuses such as a tape deck, CD (compact disk) player, tuner, and video recording/reproducing apparatus.

2. Prior Art

Some audio/visual apparatuses are provided with a so-called sleep timer which operates to automatically turn off the apparatus when a predetermined length of time has elapsed so that the apparatus is not left turned on after the user has fallen asleep.

The conventional sleep timers have a plurality of time settings of predetermined lengths, for example, 90, 60, and 30 minutes, each of which is selected in a cyclic manner such as 90, 60, 30, 90, . . . , each press of a sleep key. When a user wants to enjoy a music tape in bed till he falls asleep, this type of timer must be set to 60 minutes if the required time for reproducing the audio information in the tape is, for example, 45 minutes. In this case, the tape deck remains turned on for some time after the reproduction of the music tape has completed. Also, when the user wants to listen to the radio or watch television in bed till he falls asleep, the tuner noise continues to radiate from the speaker or the picture and sound continue if the broadcast is over before the timer times to zero.

SUMMARY OF THE INVENTION

An object of the present invention is to provide a sleep timer in which an auto sleep mode is incorporated as well as a conventional sleep timer mode so that the waste of electric power and the continuous radiation of background noise from, for example, a speaker are prevented by turning off the source equipment of audio/visual information recording/reproducing apparatuses as soon as the reproduction and/or recording of the information is over.

Another object of the invention is to provide a sleep timer in which one of an auto sleep mode and a conventional sleep timer mode is selectively set through a simple press operation of a single sleep key on the panel.

Still another object of the invention is to provide a method of sleep timer operation in which an auto sleep mode and a conventional sleep timer mode are selectively set.

When a sleep key is pressed, a program is run so as to perform the timer operation for the audio/visual source equipment. If the source equipment such as a cassette tape deck, or CD player is in the recording mode or the reproducing mode, the auto sleep mode is entered. A displayer, then, indicates that the source equipment is now in the auto sleep mode. If the tape deck is neither in the recording mode nor in the playback mode and the CD player is not playing back, the conventional sleep timer mode is entered.

In the auto sleep mode, a CPU starts monitoring signals indicative of the end of operation of the source equipment, such as the output of a photo interrupter output from the tape deck when the playback of the cassette tape is over, an end code from the CD player which indicates the end of reproduction of the information recorded in the disk, and a signal indicative of the absence of broadcast wave which indicates the broadcast is over. When the CPU receives these signals indicative of the completion of reproduction, recording, or broadcast, it outputs a command to a power-turn-off circuit to turn off the source equipment.

In the conventional timer mode, the CPU starts monitoring the timer output for the expiration of a predetermined length of time setting. When the CPU detects that the timer times to zero, the CPU sends a command to the power-turn-off circuit so as to turn off the source equipment.

According to the present invention, a method of setting in a standby condition source equipment for audio/visual apparatuses having a timer, comprises steps of:

outputting, when commanded by an operator, a first signal for activating a timer operation which has a first timer mode and a second timer mode;

selecting said first timer mode if at least one of the source equipment is operating, and selecting said second timer mode if none of the source equipment is operating;

setting a predetermined length of time to the timer when said second timer mode is selected;

outputting a second signal in the first timer mode when the source equipment completes an operation thereof, and outputting a third signal when said predetermined length of time of said timer expires; and setting said source equipment in a standby condition in response to said second signal as well as said third signal.

BRIEF DESCRIPTION OF THE INVENTION

Features and other objects of the present invention will be more apparent from the description of preferred embodiments with reference to the accompanying drawings in which.

DESCRIPTION OF THE PREFERRED EMBODIMENT

Figure 1:
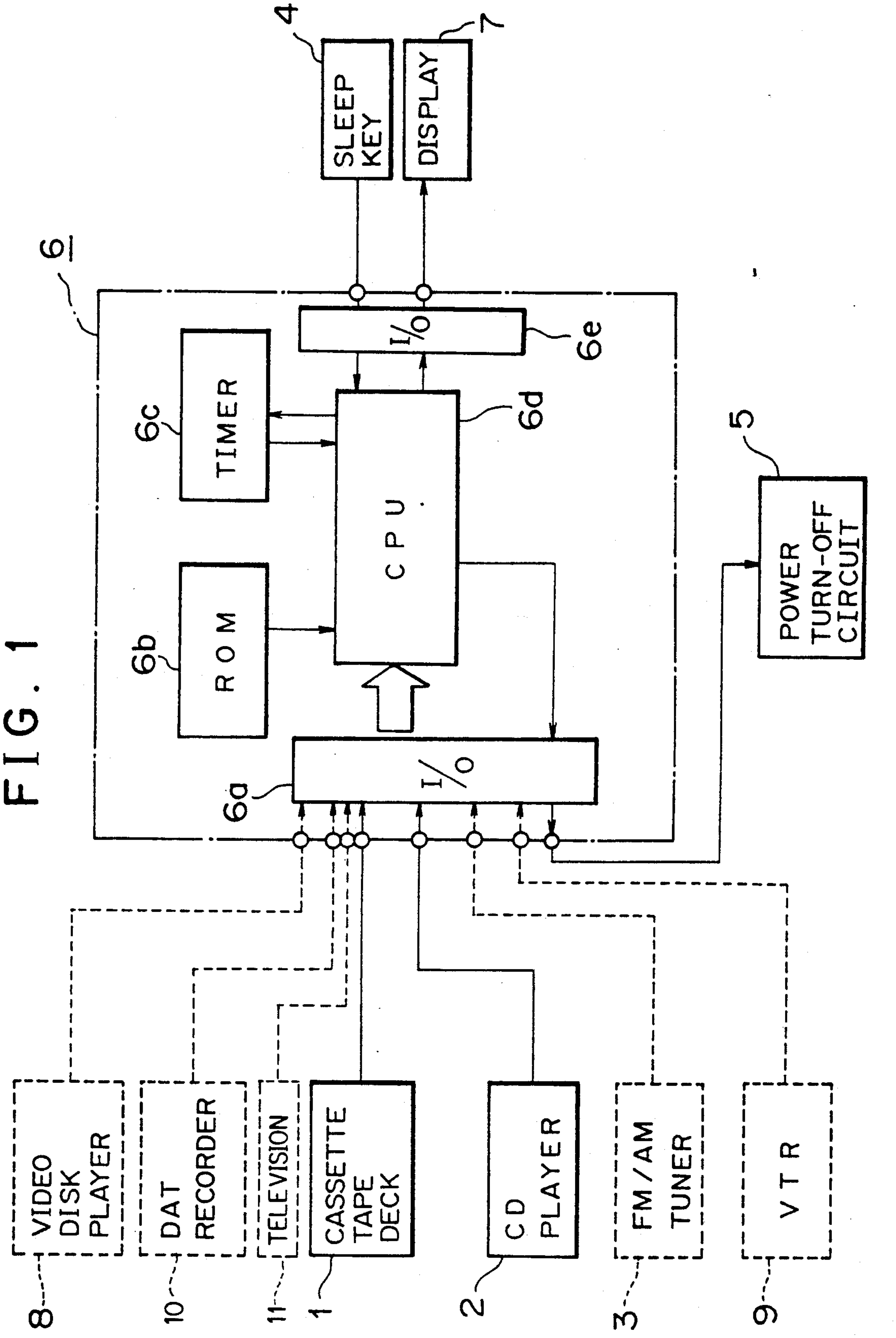
FIG. 1 is a block diagram showing an embodiment of the present invention.

FIG. 1 is a block diagram showing an embodiment of a sleep timer according to the present invention.

A microcomputer 6 incorporates a ROM *6b*, timer *6c*, CPU *6d*, and input/output ports *6a* and *6e*. The CPU *6d* carries out the program instructions of a sleep timer program stored in the ROM *6b* so as to control the operation of a sleep timer according to the present invention.

A sleep key 4 is a key that serves as a sleep timer activating means for setting and disabling the auto sleep timer mode as well as the conventional sleep timer mode. The CPU operates as a timer-mode selecting means which selects either the auto sleep timer mode or the conventional sleep timer mode in response to a command signal from a user supplied via the sleep key 4. The CPU also operates as a time-up-detecting means which detects the expiration of set time to output a command to a power-turn-off circuit 5, which functions as a power-turn-off means, so that the source equipment is turned off. The source equipment includes a DAT (digital audio tape) recorder 10, video disk (laser disk) player 8, FM/AM tuner 3, VTR (video tape recorder) 9, television set 11, cassette tape deck 1, and CD player 2. For digital equipment such as DAT (digital audio tape) recording-reproducing apparatuses and video disk (laser disk) reproducing apparatuses, the completion of recording/reproduction is detected by means of a conventional way, for example, control codes such as end code, and for an audio tape deck or the like the end of the magnetic tape is detected through the use of, for example, a photo interrupter (not shown) that is mounted to the reel shaft to rotate together with the shaft to detect the stoppage of the take up reel, For equipment such as FM/AM tuners and television sets, the completion of broadcast is detected by the absence of the broadcasting wave.

Additionally, the CPU receives associated information such as the types and kinds of the respective source equipment, the names of tunes to be reproduced and time required for the remaining tunes or programs from the cassette tape deck 1 and CD player 2 via an input output device I/O, and sends the information to the displayer 7 so as to indicate appropriately. The displayer 7 will be described later in more detail with reference to FIG. 2. In the auto sleep mode, the CPU operates as an auto sleep means and detects the completion of reproducing operation of the source equipment to turn off the source equipment. In the conventional sleep timer mode, when the timer times up, the CPU outputs the command to the power-turn-off circuit 5 to turn off the source equipment. In either of the modes, the source equipment are turned off as soon as the reproduction or recording operation is over so that the equipment goes into a standby condition where only circuits necessary for performing minimum required functions such as clock operation and the reception of remote control signals, remain turned on. The timer 6c operates as a sleep-time-setting means and the CPU sets the timer 6c for a time length for which the source equipment is held turned on after the conventional timer mode is selected.

Operation

Figure 2:
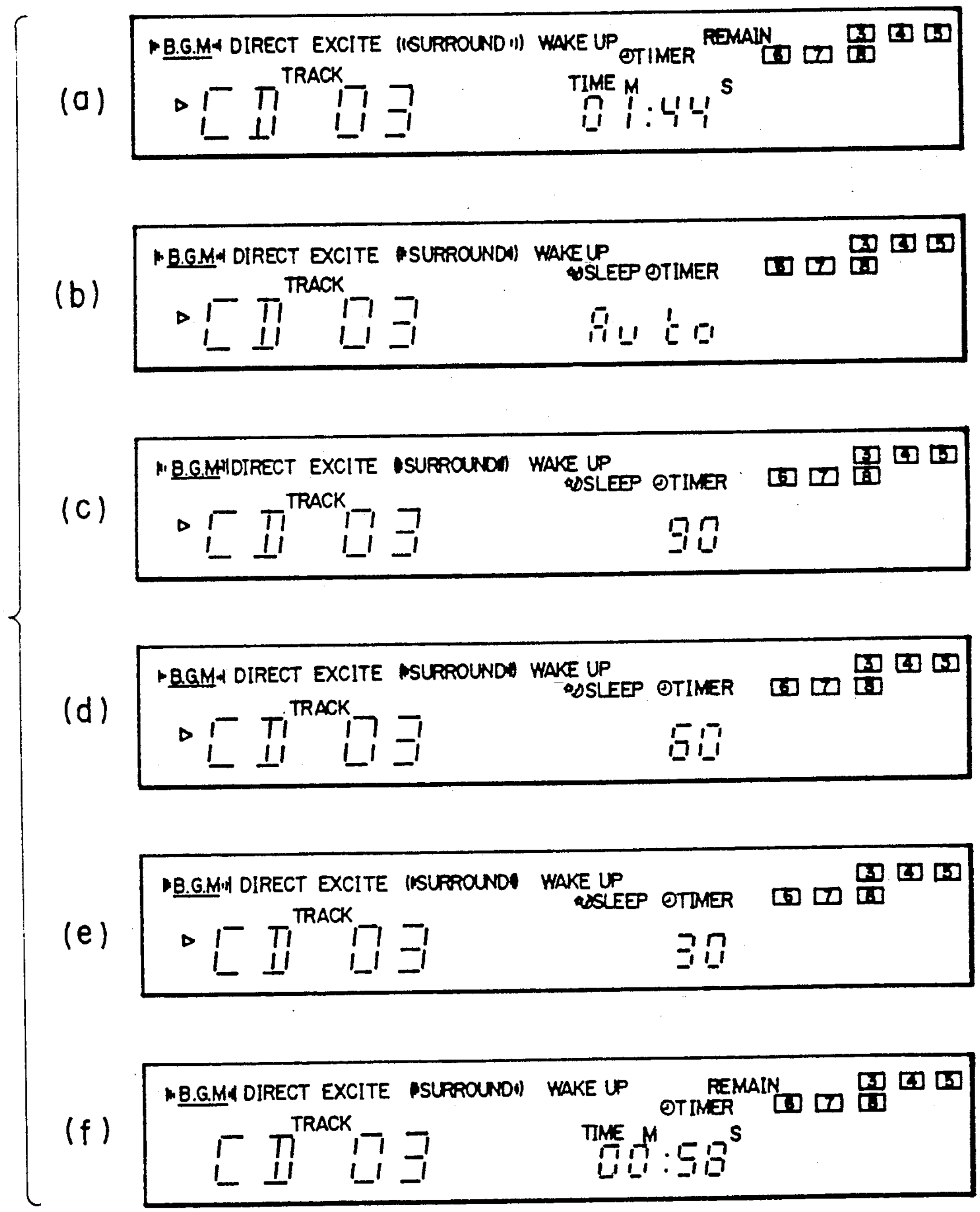
FIG. 2 illustrates a sample display of a displayer showing the operation of the present invention.

The operation of the present invention will now be described with respect to a cassette tape deck and a CD player used as source equipment. In FIG. 2, a display (a) shows the panel of CD player 2 in the reproduction mode before the sleep key 4 is pressed. The display (a) shows that the third tune out of a total of eight tunes recorded in the disk is being played back and the remaining time of the third tune is one minute and 44 seconds. When the sleep key 4 is pressed, the program stored in the ROM 6b is run so as to perform the timer operation of the present invention.

The display (b) shows the CD player 2 in the auto sleep mode when the sleep key 4 is first pressed. The characters "Auto" appears in the time-displaying window, and a star and moon symbol and characters "SLEEP" are shown above the window so as to inform the user that the auto sleep mode has been selected. The program waits, for example, five seconds while monitoring the operation of sleep key 4. If the sleep key is not pressed again during the five seconds, then the auto sleep mode is actually entered. In the auto sleep mode, a decision is made based on whether the cassette tape deck 1 is in the record mode or in the playback mode, or either the tape deck 1 or the CD player 2 is in the reproducing mode. The CPU starts monitoring the information from the cassette tape deck for the end of cassette tape. The CPU also receives a variety of control-signals from the CD player to detect the end code indicative of the end of information recorded in the disk being played back. When the CPU receives signals indicative of the completion of reproduction of the source equipment, the CPU outputs the command to the power-turn-off circuit 5 to turn off the source equipment so that the equipment goes into a standby condition where only the limited number of circuits are left on for, for example, a clock and the reception of remote control signals.

If the sleep key 4 is pressed again during the five second period after the sleep key 4 is first pressed, the program goes into the conventional sleep timer mode. A display (c) in FIG. 2 shows a sample display of the displayer 7 when the 90 min. timer is set. Pressing the sleep key 4 in a similar manner allows the timer settings to be selected in order, i.e., 60 min., 30 min., and then disabling the timer as denoted by displays (d) and (e) in FIG. 2. Further pressing the sleep key 4 causes the timer to be disabled and the program to return to its initial step and the displayer 7 indicates the initial condition of the source equipment with the remaining reproduction time of the third tune having decreased to 58 seconds as shown in a display (f) in FIG. 2. In this manner, the program goes through the respective steps of setting timers in order each time the sleep key 4 is pressed, i.e., auto sleep mode, conventional sleep timer mode, 90 min., 60 min., 30 min, disabling the sleep timer mode, auto sleep mode, . . . etc.

Once the timer has been set in the conventional sleep timer mode, the CPU starts monitoring the timer output. When the CPU detects the expiration of timer setting, the CPU outputs the command to the power-turn-off circuit 5 to shut off the power to the source equipment so that the equipment go into a standby condition where only a minimum number of circuits are left on for performing functions such as a clock and reception of remote control signals.

DESCRIPTION OF FLOWCHART

Figure 3:
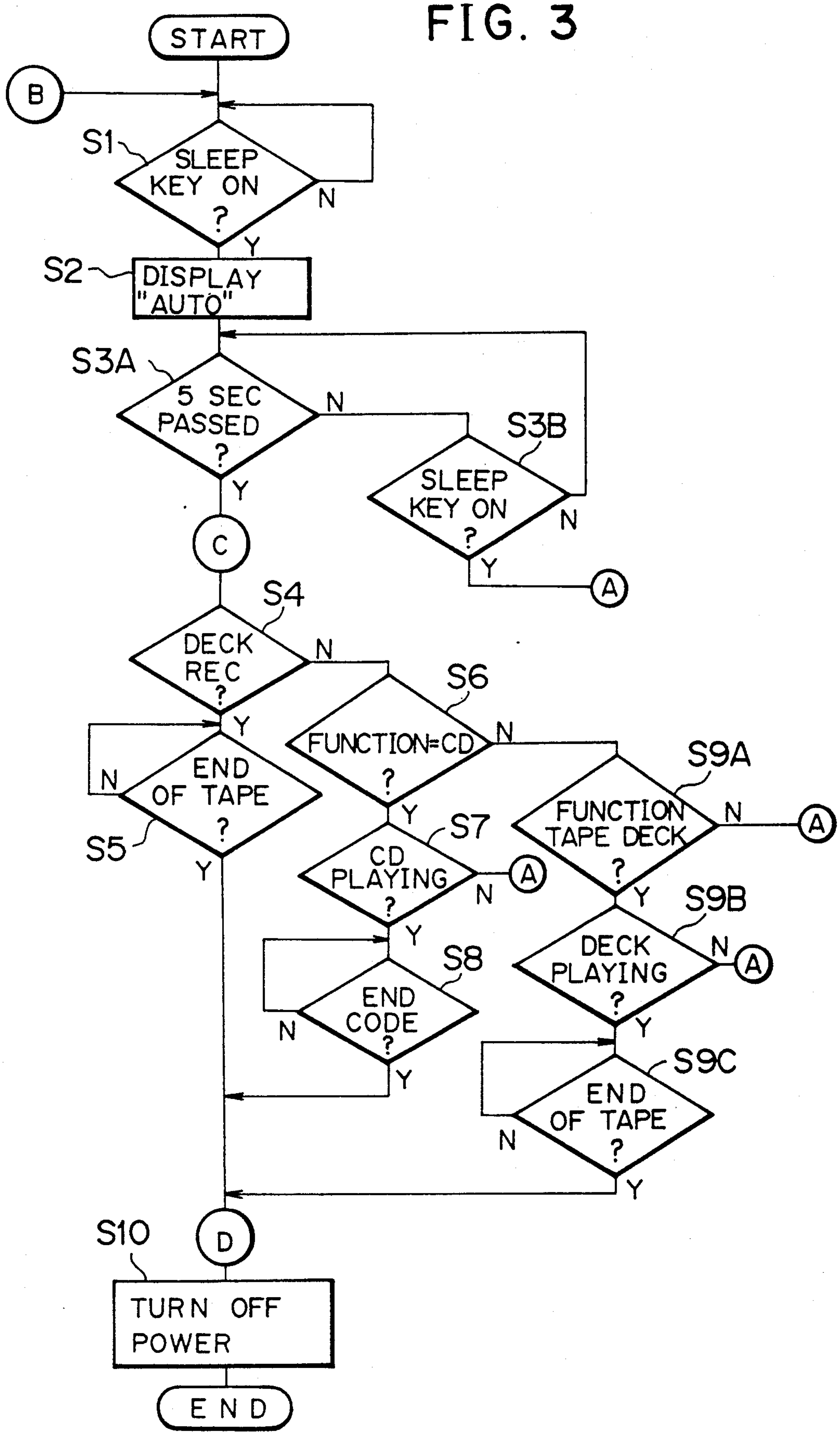
FIG. 3 is a flowchart showing the operation of the auto sleep mode of the present invention.
Figure 4:
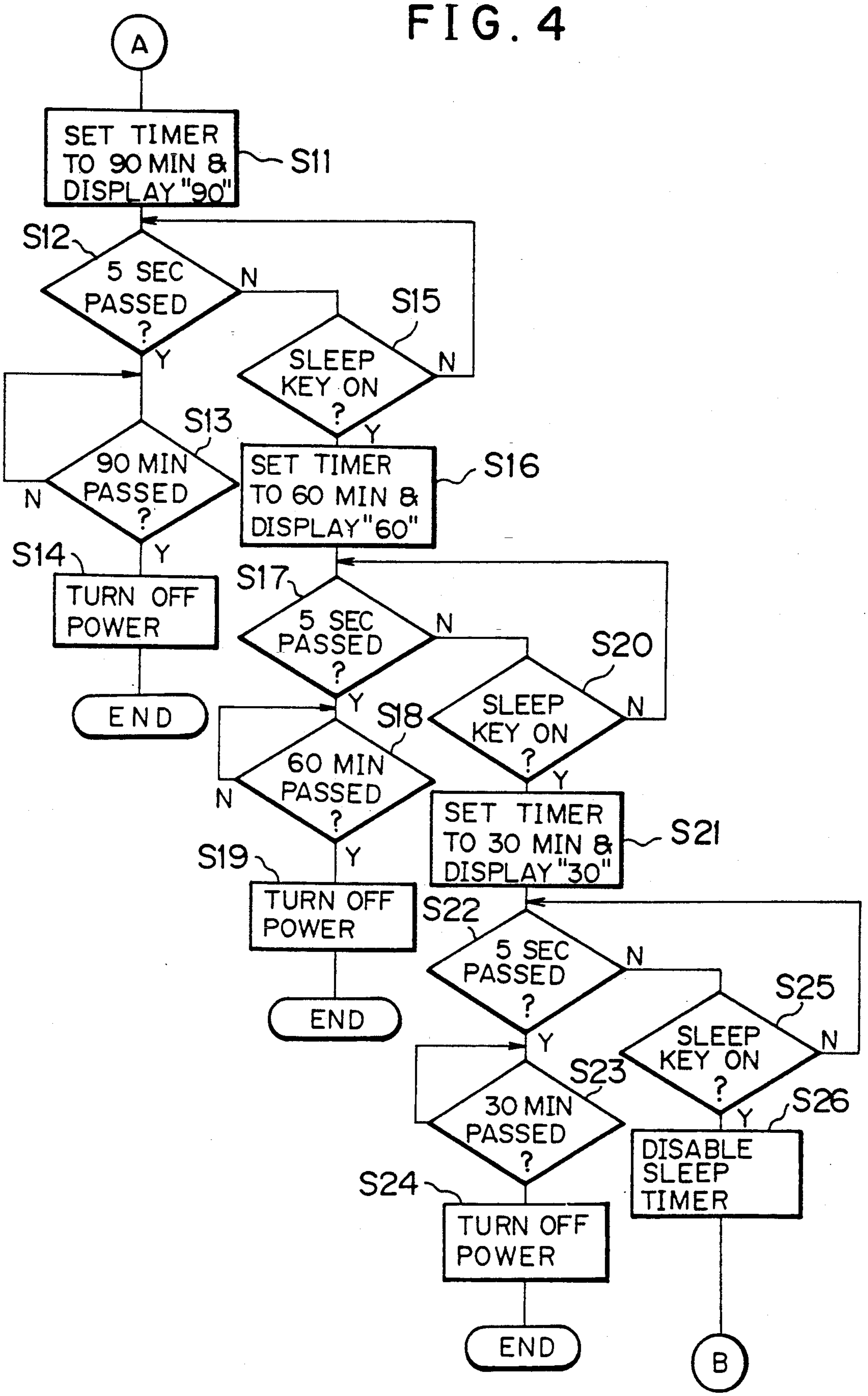
FIG. 4 is a flowchart showing the operation of a conventional timer operation, which is also part of the operation of the present invention.

The operation of an embodiment of a sleep timer according to the present invention will now be described in detail with reference to flowcharts in FIGS. 3 and 4 showing the operation of the invention with respect to the cassette tape deck 1 and CD player 2 used as source equipment.

A decision is made based on whether the sleep key 4 has been pressed (step 1). If the sleep key 4 is pressed, then a display 7 displays "Auto" (step 2). Then, a decision is made based on whether a predetermined time, for example, five seconds has elapsed after the sleep key 4 is first pressed (step 3A); if NOT, then a decision is made based on whether or not the sleep key 4 is pressed again (step 3B). If five seconds has passed at step 3A, then the program goes into the auto sleep mode according to the present invention. A decision is made whether or not the cassette tape deck 1 is in the record mode (step 4). If the deck 1 is in the recording mode, then a decision is made whether or not the end of tape is detected (step 5); if YES, the program proceeds to step 10 to send a command to the power-turn-off circuit 5 so as to allow all the source equipment to be in a standby condition.

If the deck 1 is not in the recording mode at step 4, the program proceeds to step 6 to make a decision based on whether or not the selected function is CD. The term function is used in the present invention to refer to what source equipment to be reproduced has been selected by the user. For example, if the function is CD, then an audio signal from the CD is radiated from the speaker. If the function is the CD player 2 at step 6, the program proceeds to step 7 to make a decision whether the CD is in the playing mode; if YES, the program proceeds to step 8, if NOT, the program jumps to step 11 in FIG. 4. When the end code from the CD player is detected at step 8, then the program proceeds to step 10 to allow all the source equipment to be in a standby condition.

If the function is not CD at step 6, then the program proceeds to step 9A to make a decision whether the function is the cassette tape deck; if YES, the program proceeds to step 9B, if NOT, the program jumps to step 11 in FIG. 4. When the end of tape is detected at step 9C, then the program proceeds to step 10 to allow all the source equipment to be in a standby condition.

It should be noted that in the flowchart in FIG. 3, a priority is given to the recording mode of the cassette tape deck 1 so that when the deck 1 is in the recording mode, no other source equipment is interrogated even if, for example, the CD player is playing. This is because it is more convenient to the user that the deck is left on till the recording operation thereof has completed rather than being turned off suddenly while the recording operation is in progress. The flowchart may, of course, be modified to give equal priority to both the end of the recording mode of cassette 1 and the end of the CD player.

If the program recognizes that the sleep key 4 has been pressed again at step 3B, then the program jumps to the conventional timer mode. That is, the program proceeds to step 11 to set the 90-minute timer and displays "90" as depicted by (c) shown in FIG. 2. Then, at step 12, a decision is made based on whether or not five seconds has passed; if YES, then the program proceeds to step 13 to monitor the timer output for the expiration of 90 minutes. When 90 minutes has passed, all the source equipment are allowed to be in a standby condition (step 14).

If five seconds has not passed yet at step 12, the program proceeds to step 15 to make a decision based on whether or not the sleep key 4 has been pressed again within five seconds after the 90 min. timer is set; if YES, the program proceeds to step 16 where the 60 min. timer is set and "60" is displayed as depicted by (d) in FIG. 2. Then, a decision is made based on whether or not five seconds has passed after the 60 min. timer is set (step 17); if five seconds has passed, then the program proceeds to step 18 to monitor the 60 min. timer output for expiration of 60 min. setting. When the 60 min. timer times to zero, the program sends the command to the power-turn-off circuit 5 to allow all the source equipment to be in a standby condition (step 19).

If five seconds has not passed yet at step 17, the program proceeds to step 20 to make a decision based on whether or not the sleep key 4 has been pressed again within five seconds after the 60 min. timer is set; if NOT, the program returns to step 17, if YES, the program proceeds to step 21 to set the 30 min. timer and to display "30" as depicted by (e) in FIG. 2. Then, a decision is made based on whether or not five seconds has passed after the 30 min. timer is set (step 22); if five seconds has passed, then the program proceeds to step 23 to monitor output of the timer till the setting of 30 min. expires. When the 30 min. timer times to zero, the program sends the command to the power-turn-off circuit 5 to allow all the source equipment to be in a standby condition (step 24).

If five seconds has not passed yet at step 22, the program proceeds to step 25 to make a decision based on whether or not the sleep key 4 has been pressed again within five seconds after the 30 min. timer is set; if NOT, the program returns to step 22, if YES, the program disables all the settings of timer (step 26) and returns to step 1. At this time, the displayer 7 returns to the initial display as depicted by the display (f) in FIG. 2 before the aforementioned timer setting procedure is taken again. Of course, the reproduction of information of the CD is going on while the auto sleep timer mode or the conventional sleep timer mode is being set. Therefore, the remaining time of the third tune is now 58 seconds as depicted by (f) in FIG. 2. After the program has returned to step 1, every time the sleep key 4 is pressed, the aforementioned steps 1-26 are processed in order.

Figure 5:
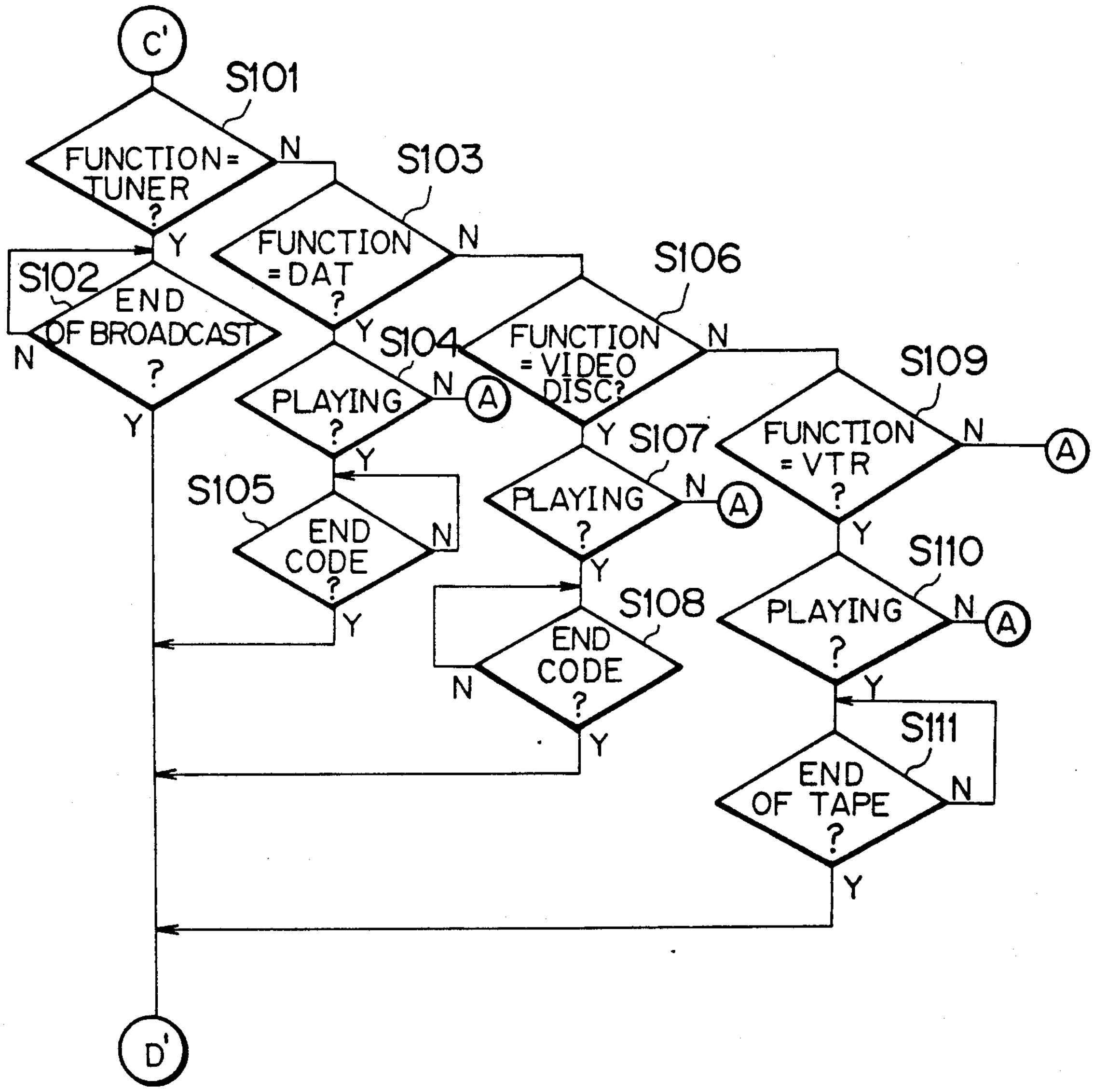
FIG. 5 is a flowchart showing another embodiment of the auto sleep mode of the present invention.

While the above-described embodiment has been described with respect to the cassette tape deck 1 and the CD player 2, the present invention may also be applied to a variety of source equipment including audio/visual equipment as shown in FIG. 5. For example, the embodiment may be modified by replacing the steps 4-9C by steps 101-111 in FIG. 5.

What is claimed is:

1. A sleep timer for audio/visual apparatuses for turning off source equipment of audio/visual signals, comprising:
- sleep timer activating means for outputting a first signal to activate a timer operation having a first mode and a second mode;
- timer-mode selecting means responsive to said first signal, said timer-mode selecting means selecting said first mode if at least one of the source equipment is operating, and selecting said second mode if the source equipment are not operating;
- sleep time setting means which is set to a predetermined length of time by said timer-mode selecting means when said second mode is selected;
- time-up-detecting means for outputting a second signal in the first mode when said at least one of source equipment completes an operation thereof, and for outputting a third signal when said predetermined length of time of said sleep time setting means expires; and
- power-turn-off means for turning off said source equipment in response to said second signal as well as said third signal.

2. A sleep timer for audio/visual apparatuses according to claim 1, said sleep timer activating means is a press key, a first press of said press key causing said timer-mode selecting means to select said first mode and a second press of said press key within a predetermined time length after said first press causing said timer-mode selecting means to select said second mode.

3. A sleep timer for audio/visual apparatuses according to claim 1, wherein said source equipment of audio/visual signals include a CD player, video disk player, digital audio tape recorder, AM/FM tuner, television receiver, VTR, and audio magnetic tape deck.

4. A sleep timer for an audio/visual apparatuses according to claim 1, wherein said power-turn-off means turns off all of said source equipment.

5. A sleep timer for audio/visual apparatuses according to claim 1, wherein said power-turn-off means turns off said source equipment so that the source equipment are in a standby condition.

6. A sleep timer for audio/visual apparatuses according to claim 1, wherein said first mode and said second mode are selected in a cyclic fashion in response to said first signal, and said second mode has a plurality of predetermined time lengths for said sleep time setting means and said sleep time setting means is set to said plurality of predetermined time lengths in order in response to said first signal.

7. A method of setting in a standby condition source equipment for audio/visual apparatuses having a timer, comprising the steps of:

outputting, when commanded by an operator, a first signal for activating a timer operation which has a first mode and a second mode;

selecting said first mode if at least one of the source equipment is operating, and selecting said second mode if none of the source equipment is operating;

setting a predetermined length of time in the timer when said second mode is selected;

outputting a second signal in the first mode when the source equipment completes an operation thereof, and outputting a third signal in the second mode when said predetermined length of time of said timer expires; and setting said source equipment in a standby condition in response to said second signal as well as said third signal.

* * * * *